(12) United States Patent
Schornack et al.

(10) Patent No.: US 11,501,257 B2
(45) Date of Patent: Nov. 15, 2022

(54) METHOD AND APPARATUS FOR IMPLEMENTING A ROLE-BASED ACCESS CONTROL CLUSTERING MACHINE LEARNING MODEL EXECUTION MODULE

(71) Applicant: JPMorgan Chase Bank, N.A., New York, NY (US)

(72) Inventors: Laura Schornack, Oak Park, IL (US); Derek Ferguson, Palos Park, IL (US); Megan Hawkins, West Lafayette, IN (US); Ryan Evan Porter, Orange Village, OH (US); Sheev Modi, Champaign, IL (US); August Gress, Indianola, IL (US); Shreyas Byndoor, Champaign, IL (US); Rongzi Wang, Oak Grove, CA (US); Jiamin Zhu, Naperville, IL (US); Benjamin Vonderheide, Tinley Park, IL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 440 days.

(21) Appl. No.: 16/707,836

(22) Filed: Dec. 9, 2019

(65) Prior Publication Data
US 2021/0174305 A1 Jun. 10, 2021

(51) Int. Cl.
G06F 17/00 (2019.01)
G06F 7/00 (2006.01)
(Continued)

(52) U.S. Cl.
CPC ......... *G06Q 10/105* (2013.01); *G06F 16/285* (2019.01); *G06N 5/04* (2013.01); *G06N 20/00* (2019.01)

(58) Field of Classification Search
CPC .... G06Q 10/105; G06F 16/285; G06N 20/00; G06N 5/04
(Continued)

(56) References Cited

U.S. PATENT DOCUMENTS

2008/0320549 A1* 12/2008 Bertino ............... G06F 21/604
726/1
2012/0047575 A1* 2/2012 Baikalov ............. G06F 21/604
726/21
(Continued)

OTHER PUBLICATIONS

Official communication (Search Report and Opinion) in W.I.P.O Patent Application No. PCT/US2020/063807, dated Feb. 24, 2021.

*Primary Examiner* — Pavan Mamillapalli
(74) *Attorney, Agent, or Firm* — Greenblum & Bernstein, P.L.C.

(57) ABSTRACT

Various methods, systems, apparatuses, and media for implementing a machine learning model execution module are provided. A processor accesses human resource (HR) attributes and profile information data of users from a database. The processor applies hierarchical clustering algorithm to create a machine learning model by clustering users based on accesses to applications that the users have corresponding to the profile information data of the users. All users in one cluster have the most similar accesses to applications. The processor iterates the process of accessing the HR attributes and the profile information data of the users from the database until it is determined that an optimal number of clusters have been created for the machine learning model.

20 Claims, 7 Drawing Sheets

(51) Int. Cl.
  *G06Q 10/10* (2012.01)
  *G06F 16/28* (2019.01)
  *G06N 5/04* (2006.01)
  *G06N 20/00* (2019.01)
(58) Field of Classification Search
  USPC .......................................................... 707/737
  See application file for complete search history.

(56) References Cited

U.S. PATENT DOCUMENTS

| | | | |
|---|---|---|---|
| 2012/0246098 A1* | 9/2012 | Chari | G06N 20/00 706/12 |
| 2014/0075492 A1 | 3/2014 | Kapadia et al. | |
| 2014/0129268 A1 | 5/2014 | B'Far et al. | |
| 2015/0242486 A1 | 8/2015 | Chari et al. | |
| 2017/0201525 A1* | 7/2017 | Biller | G06N 7/005 |

* cited by examiner

METHOD AND APPARATUS FOR IMPLEMENTING A ROLE-BASED ACCESS CONTROL CLUSTERING MACHINE LEARNING MODEL EXECUTION MODULE

TECHNICAL FIELD

This disclosure generally relates to role-based access control (RBAC) model, and, more particularly, to methods, systems, and apparatuses for implementing an RBAC clustering machine learning model execution module for automatically generating an optimal number of clusters thereby significantly reducing processing time of requests for access to one or more applications received from a computing device.

BACKGROUND

Today, many companies or organizations having a large number of employees face difficulties with clustering a group of employees (i.e., users) that may share applications and entitlements. For example, a company or an organization may assign each employee access permissions to certain applications based on the employee's human resource (HR) attributes received from an HR database of the company or the organization. Conventionally, a security administrative tool (SAT) team of the company or the organization may determine that the applications and the accesses to such applications be given to the large number of employees based on determining the consumer business (CB) or the line-of-business (LOB) the employees may belong to. In doing so, conventionally, a relatively large number of profiles or roles may be created on the basis of the HR attributes, i.e., Job Code and Cost center, of each employee to group or cluster employees manually. These manual generation of groups or clusters are extremely time consuming and not consistent, and particularly, commonality of applications shared among multiple users and out of role access of applications are unsatisfactory. Further, at least a couple of times a year, the companies or organizations may ask the manager of the employee that has access to the applications to re-certify that the employee still needs it. For example, most companies or organizations may also perform periodic recertification of access to sensitive areas and at this stage a manager of the employee that had access to the applications may be asked to confirm if the access to the employee is still needed. With very large companies, with very large amount of permissions, this may become unwieldy very quickly.

SUMMARY

In view of the foregoing, it would be desirable to provide a solution for efficiently processing requests for access to one or more applications as well as recertification in a very short amount time, i.e., within minutes, which overcomes the above-described deficiencies and shortcomings.

The present disclosure, through one or more of its various aspects, embodiments, and/or specific features or sub-components, provides, among others, various systems, servers, devices, methods, media, programs, and platforms for implementing an RBAC clustering machine learning model execution module for dynamically and automatically generating optimal number of clusters thereby significantly reducing processing time of requests to access one or more applications received from a computing device. The present disclosure, through one or more of its various aspects, embodiments, and/or specific features or sub-components, also provides, among others, various systems, servers, devices, methods, media, programs, and platforms for implementing an RBAC clustering machine learning model execution module for dynamically and automatically generating optimal number of clusters thereby significantly reducing processing time of requests to access one or more applications received from a computing device eliminating the conventional need of generating statically assigned set of permissions and roles. According to the context of the exemplary embodiments of the instant disclosure, by utilizing the RBAC clustering machine learning model execution module, determination may be made at the time of request to access one or more applications in real time (e.g., within a range of about 100 ms to about 1 s, but the disclosure is not limited thereto) whether to grant access to one or more applications requested by a user.

According to an aspect of the present disclosure, a method for implementing a machine learning model execution module for automatically generating an optimal number of clusters for granting access to a plurality of applications by utilizing one or more processors and one or more memories is disclosed. The method may include: providing a database that stores human resource (HR) attributes and profile information data of users; accessing the HR attributes and the profile information data of the users from the database; applying hierarchical clustering algorithm, by utilizing a processor, to create a machine learning model by clustering users based on accesses to applications that the users have corresponding to the profile information data of the users, wherein all users in one cluster have the most similar accesses to applications; and iterating the process of accessing the HR attributes and the profile information data of the users from the database until it is determined that an optimal number of clusters have been created for the machine learning model.

According to another aspect of the present disclosure, the method may further include: determining the optimal number of clusters based on determining the least number of clusters with the greatest number of commonality, wherein the commonality is a similarity between a user's existing applications and applications included in the profile that the user belongs to.

According to yet another aspect of the present disclosure, the optimal number of clusters may be a point in a line curve of a graph at which increasing the number of clusters does not increase the commonality, and wherein the number of clusters corresponds to an x-axis of the graph and the commonality corresponds to a y-axis of the graph.

According to a further aspect of the present disclosure, the greatest number of commonality may include about 70% to about 90% similarity between a user's existing applications and applications included in the profile that the user belongs to.

According to another aspect of the present disclosure, the machine learning model may be a role-based access control machine learning model that includes the optimal number of clusters.

According to yet another aspect of the present disclosure, each cluster may include unique security identifiers of all users belonging to the cluster and data regarding the users' common accesses to the applications.

According to an additional aspect of the present disclosure, the HR attributes of each user may include data regarding one or more of the following: job code, cost center, location, position, and title, but the disclosure is not limited thereto.

According to a further aspect of the present disclosure, the method may further include: receiving a request from a new user to access one or more applications within the machine learning model; automatically updating a cluster from the machine learning model to which the new user should belong based on determining a commonality between applications corresponding to the new user's profile information and the applications corresponding to profile information of the users already belonging to the cluster; dynamically and automatically updating the machine learning model based on the updated cluster; and granting access to the new user in real time to access one or more requested applications from the updated machine learning model.

According to another aspect of the present disclosure, the commonality may include about 70% to about 90% similarity between applications corresponding to the new user's profile information and the applications corresponding to profile information of the users already belonging to the cluster.

According to yet another aspect of the present disclosure, the method may further include: receiving a request from a new user to access one or more applications within the machine learning model; and evaluating the received request with the machine learning model in real time to deny access to the requested one or more applications based on determining that the new user's profile information does not include the requested one or more applications.

According to a further aspect of the present disclosure, a system for implementing a machine learning model execution module for automatically generating an optimal number of clusters for granting access to a plurality of applications is disclosed. The system may include a database that stores human resource (HR) attributes and profile information data of users; and a processor operatively connected to the database via a communication network. The processor may be configured to: access the HR attributes and the profile information data of the users from the database; apply hierarchical clustering algorithm to create a machine learning model by clustering users based on accesses to applications that the users have corresponding to the profile information data of the users, wherein all users in one cluster have the most similar accesses to applications; and iterate the process of accessing the HR attributes and the profile information data of the users from the database until it is determined that an optimal number of clusters have been created for the machine learning model.

According to another aspect of the present disclosure, the processor may be further configured to: determine the optimal number of clusters based on determining the least number of clusters with the greatest number of commonality, wherein the commonality is a similarity between a user's existing applications and applications included in the profile that the user belongs to.

According to yet another aspect of the present disclosure, the processor may be further configured to: receive a request from a new user to access one or more applications within the machine learning model; automatically update a cluster from the machine learning model to which the new user should belong based on determining a commonality between applications corresponding to the new user's profile information and the applications corresponding to profile information of the users already belonging to the cluster; dynamically and automatically update the machine learning model based on the updated cluster; and grant access to the new user in real time to access one or more requested applications from the updated machine learning model.

According to a further aspect of the present disclosure, the processor may be further configured to: receive a request from a new user to access one or more applications within the machine learning model; and evaluate the received request with the machine learning model in real time to deny access to the requested one or more applications based on determining that the new user's profile information does not include the requested one or more applications.

According to another aspect of the present disclosure, a non-transitory computer readable medium configured to store instructions for implementing a machine learning model execution module for automatically generating an optimal number of clusters for granting access to a plurality of applications is disclosed. The instructions, when executed, may cause a processor to perform the following: access human resource (HR) attributes and profile information data of users from a database; apply hierarchical clustering algorithm to create a machine learning model by clustering users based on accesses to applications that the users have corresponding to the profile information data of the users, wherein all users in one cluster have the most similar accesses to applications; and iterate the process of accessing the HR attributes and the profile information data of the users from the database until it is determined that an optimal number of clusters have been created for the machine learning model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
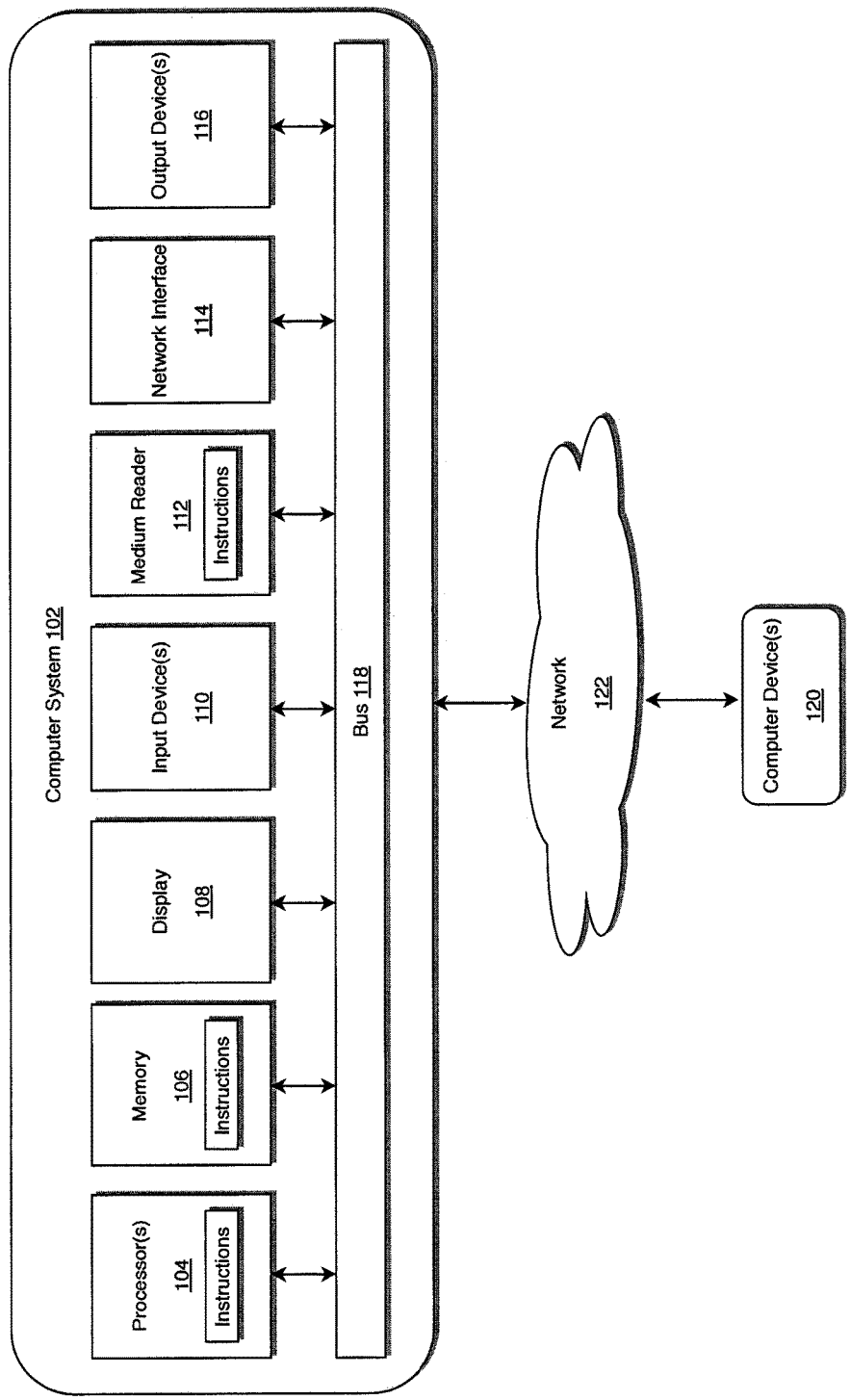
FIG. 1 illustrates a computer system for implementing a machine learning model execution module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments may provide optimized processes of implementing a machine learning model execution module for dynamically and automatically generating optimal number of clusters thereby significantly reducing processing time of requests to access one or more applications received from a computing device. In accordance with exemplary embodiments, the machine learning model execution module may be a role-based access control (RBAC) clustering machine learning model execution module. As described herein, various embodiments may also provide optimized processes of implementing an RBAC clustering machine learning model execution module for automatically generating optimal number of clusters thereby significantly reducing processing time of requests to access one or more applications received from a computing device eliminating the conventional need of generating statically assigned set of permissions and roles. According to the context of the exemplary embodiments of the instant disclosure, by utilizing the RBAC clustering machine learning model execution module, determination may be made at the time of request to access one or more applications in real time (e.g., within a range of about 100 ms to about 1 s, but the disclosure is not limited thereto) whether to grant access to one or more applications requested by a user.

Figure 2:
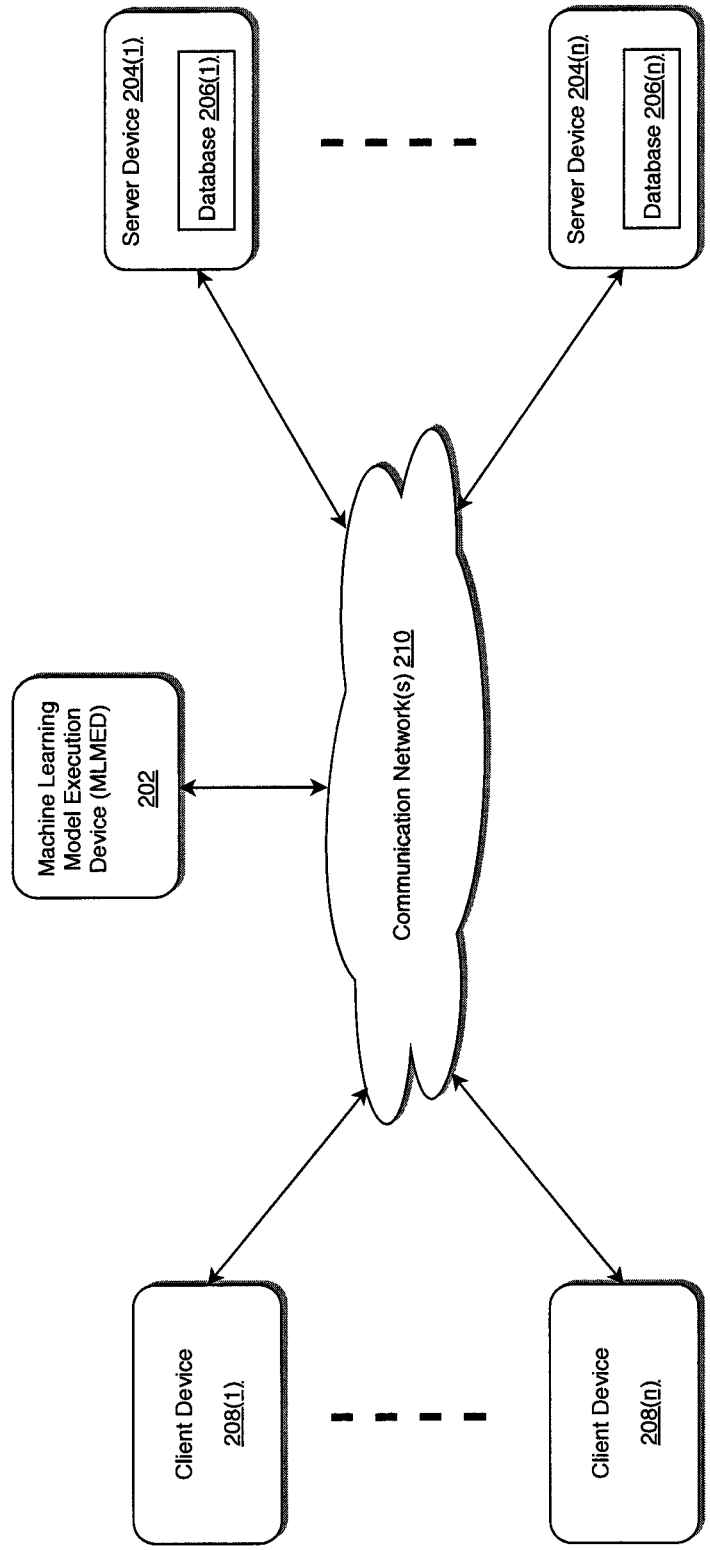
FIG. 2 illustrates an exemplary diagram of a network environment with a machine learning model execution device in accordance with an exemplary embodiment.

Referring to FIG. 2, a schematic of an exemplary network environment 200 for implementing a machine learning model execution device (MLMED) of the instant disclosure is illustrated.

Conventional system, that does not implement an MLMED of the instant disclosure, may not be able to automatically and dynamically generate optimal number of clusters thereby significantly increasing processing time of requests to access one or more applications received from a computing device. Thus, the conventional system would be required to generate manually and statically assigned set of permissions and roles which may prove to be inconsistent, and particularly, commonality of applications between cluster members and out or role access of applications of cluster members would be unsatisfactory.

According to exemplary embodiments, the above-described problems associated with conventional system may be overcome by implementing MLMED 202 having vulnerability disclosures management module as illustrated in FIG. 2. The MLMED 202 may be the same or similar to the computer system 102 as described with respect to FIG. 1.

The MLMED 202 may store one or more applications that can include executable instructions that, when executed by the MLMED 202, cause the MLMED 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MLMED 202 itself, may be located in virtual server(s) running in a cloud-based computing environment rather than being tied to one or more specific physical network computing devices. Also, the application(s) may be running in one or more virtual machines (VMs) executing on the MLMED 202. Additionally, in one or more embodiments of this technology, virtual machine(s) running on the MLMED 202 may be managed or supervised by a hypervisor.

In the network environment 200 of FIG. 2, the MLMED 202 is coupled to a plurality of server devices 204(1)-204(n) that hosts a plurality of databases 206(1)-206(n), and also to a plurality of client devices 208(1)-208(n) via communication network(s) 210. A communication interface of the MLMED 202, such as the network interface 114 of the computer system 102 of FIG. 1, operatively couples and communicates between the MLMED 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MLMED 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MLMED 202 may be a standalone device or integrated with one or more other devices or apparatuses, such as one or more of the server devices 204(1)-204(n), for example. In one particular example, the MLMED 202 may be hosted by one of the server devices 204(1)-204(n), and other arrangements are also possible. Moreover, one or more of the devices of the MLMED 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MLMED 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MLMED 202 that may be configured for dynamically and automatically generating optimal number of clusters thereby significantly reducing processing time of requests to access one or more applications received from a computing device. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the MLMED 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MLMED 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MLMED 202, the server devices 204(1)-204(n), or the client devices 208(1)-208(n), for example, may be configured to operate as virtual instances on the same physical machine. For example, one or more of the MLMED 202, the server devices 204(1)-204(n), or the client devices 208(1)-208(n) may operate on the same physical device rather than as separate devices communicating through communication network(s) 210. Additionally, there may be more or fewer MLMEDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
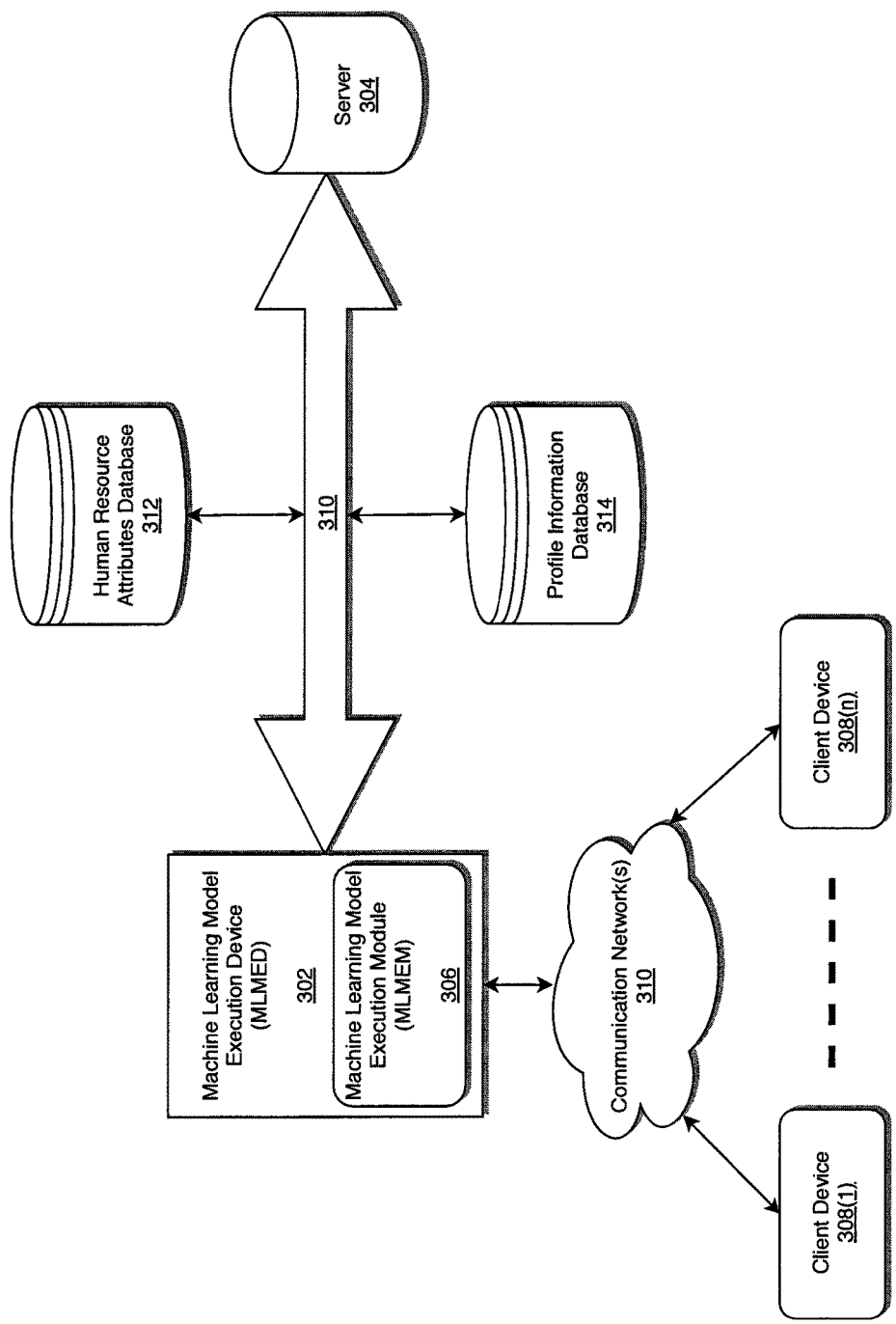
FIG. 3 illustrates a system diagram for implementing a machine learning model execution device of FIG. 2 with a machine learning model execution module in accordance with an exemplary embodiment.

FIG. 3 illustrates a system diagram for implementing an MLMED with an MLMEM in accordance with an exemplary embodiment.

As illustrated in FIG. 3, the MLMED 302 including the MLMEM 306 may be connected to a server 304, a human resource (HR) attributes database 312, and a profile information database 314 via a communication network 310. The MLMED 302 may also be connected to a first client device 308(1) and a second client device 308(n) via the communication network 310, but the disclosure is not limited thereto.

According to exemplary embodiment, the MLMED 302 is described and shown in FIG. 3 as including the MLMEM 306, although it may include other rules, policies, modules, databases, or applications, for example. According to exemplary embodiments, both the HR attributes database 312 and the profile information database 314 may constitute a single database. According to exemplary embodiments both the HR attributes database 312 and the profile information database 314 may be embedded within the MLMED 302 or within the MLMEM 306. According to exemplary embodiments, the HR attributes database 312 may store HR attributes data of users (e.g., employees, managers, etc. of a company or an organization), but the disclosure is not limited thereto. According to exemplary embodiments, HR attributes data may include one or more of the non-limiting data such as job code, cost center, location, position, and/or title, etc. of all employees and managers as well as new employees and managers of a company or an organization. The HR attributes database 312 may store unique security identifiers (SIDs) of all employees and managers and link them with corresponding HR attributes data and profile information data.

According to exemplary embodiments, the profile information database 314 may store data corresponding to profile associated with each SID. A profile may include applications and entitlements for each SID. For example, a profile may indicate applications that are accessible by a user if he or she belongs to that profile depending on their HR attributes data.

As will be described below, the MLMED 302 may be configured to access the HR attributes and the profile information data of the users from the HR attributes database 312 and the profile information database 314, respectively; apply hierarchical clustering algorithm, by utilizing a processor embedded within the MLMED 302 or within the MLMEM 306, to create a machine learning model by clustering users (e.g., all employees and managers) based on accesses to applications that the users have corresponding to the profile information data of the users received from the profile information database 314. All users in one cluster have the most similar accesses to applications. As will be described below, the MLMED 302 may be further configured to iterate the process of accessing the HR attributes and the profile information data of the users from the HR attributes database 312 and the profile information database 314, respectively, until it is determined that an optimal number of clusters have been created for the machine learning model.

The first client device 308(1) and the second client device 308(n) are illustrated as being in communication with the MLMED 302. In this regard, the first client device 308(1) and the second client device 308(n) may be "clients" of the MLMED 302 and are described herein as such. Nevertheless, it is to be known and understood that the first client device 308(1) and/or the second client device 308(n) need not necessarily be "clients" of the MLMED 302, or any entity described in association therewith herein. Any additional or alternative relationship may exist between either or both of the first client device 308(1) and the second client device 308(n) and the MLMED 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(n) may communicate with the MLMED 302 via broadband or cellular communication. Of course, these embodiments are merely exemplary and are not limiting or exhaustive.

Figure 4:
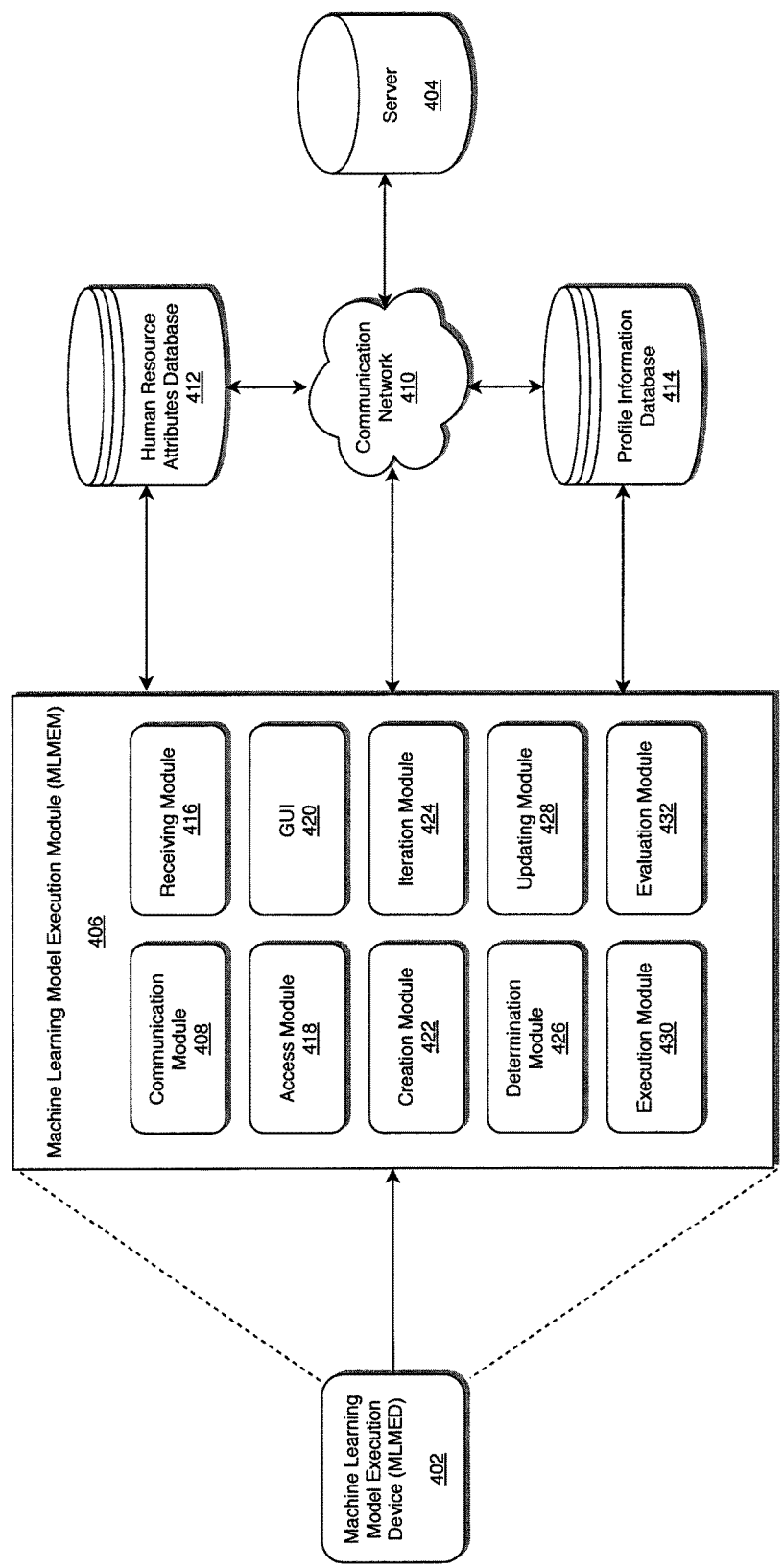
FIG. 4 illustrates a system diagram for implementing a machine learning model execution module of FIG. 3 in accordance with an exemplary embodiment.

FIG. 4 illustrates a system diagram for implementing a machine learning model execution module of FIG. 3 in accordance with an exemplary embodiment. As illustrated in FIG. 4, the system 400 may include an MLMED 402 within which an MLMEM 406 may be embedded, a human resource (HR) attributes database 412, a profile information database 414, a server 404, and a communication network 410.

As illustrated in FIG. 4, the MLMEM 406 may include a communication module 408, a receiving module 416, an access module 418, a graphical user interface (GUI) 420, a creation module 422, an iteration module 424, a determination module 426, an updating module 428, an execution module 430, and an evaluation module 432. According to exemplary embodiments, the (HR) attributes database 412 and the profile information database 414 may also be embedded within the MLMEM 406 or within the MLMED 402, and the MLMED 402 may include various systems that are managed and operated by a company or an organization. For example, a security administration tool team of a company or an organization may utilize the MLMED 402 to automatically and dynamically create an optimal number of clusters of employees that may share similar applications.

According to exemplary embodiments, each of the communication module 408, receiving module 416, access module 418, creation module 422, iteration module 424, determination module 426, updating module 428, execution module 430, and evaluation module 432 module may be implemented by microprocessors or similar, they may be programmed using software (e.g., microcode) to perform various functions discussed herein and may optionally be driven by firmware and/or software. Alternatively, each of the communication module 408, receiving module 416, access module 418, creation module 422, iteration module 424, determination module 426, updating module 428, execution module 430, and evaluation module 432 module may be implemented by dedicated hardware, or as a combination of dedicated hardware to perform some functions and a processor (e.g., one or more programmed microprocessors and associated circuitry) to perform other functions. Also, according to exemplary embodiments, each of the communication module 408, receiving module 416, access module 418, creation module 422, iteration module 424, determination module 426, updating module 428, execution module 430, and evaluation module 432 module may be physically separated into two or more interacting and discrete modules without departing from the scope of the inventive concepts.

The process may be executed via the communication network 410, which may comprise plural networks as described above. For example, in an exemplary embodiment, the various components of the MLMEM 406 may communicate with the server 404, the HR attributes database 412, and the profile information database 414 via the communication module 408 and the communication network 410. Of course, these embodiments are merely exemplary and are not limiting or exhaustive.

According to exemplary embodiments, the communication module 408 may be configured to establish a link between the HR attributes database 412 and the profile information database 414 via the communication network 410.

According to exemplary embodiments, the receiving module 416 may be configured to receive continuous feed of HR attributes data from the HR database 412 and profile information data from the profile information database 414 on a daily basis and the MLMEM 406 may be configured to store the feed of feed of HR attributes data and profile information data onto a memory (not shown) for current and future use for automatically creating clusters of users that may share similar applications based on their similarity in consumer business and/or line of business, but the disclosure is not limited thereto.

According to exemplary embodiments, the access module 418 may be configured to access the HR attributes data of users (e.g., employees and managers) from the HR database 412 and profile information data of users from the profile information database 414. According to exemplary embodiments, the HR attributes database 412 and the profile information database 414 may constitute a single database and this single database may also store data related to all previously received and newly received requests of accesses to one or more applications from users. According to exemplary embodiments, the access module 418 may be configured to access all data related to HR attributes of users, profile information of users, and all previously received and newly received requests of accesses to one or more applications from users which are to be utilized by the creation module 422 to create clusters of users that may share similar applications.

According to exemplary embodiments, the creation module 422 may be configured to receive all data related to HR attributes of users, profile information of users, and all previously received and newly received requests of accesses to one or more applications from users and may be configured to apply hierarchical clustering algorithm to create a machine learning model by clustering users based on accesses to applications that the users have corresponding to the profile information data of the users. The created machine learning model may be displayed onto the GUI 420. All users in one cluster have the most similar accesses to applications.

According to exemplary embodiments, the iteration module 424 may be configured to iterate the process of accessing the HR attributes and the profile information data of the users from the corresponding databases 412, 414, or from the single database until it is determined that an optimal number of clusters have been created for the machine learning model.

According to exemplary embodiments, the determination module 426 may be configured to determine the optimal number of clusters based on determining the least number of clusters with the greatest number of commonality, wherein the commonality is a similarity between a user's existing applications and applications included in the profile that the user belongs to.

According to exemplary embodiments, the receiving module 416 may be further configured to receive a request from a new user to access one or more applications within the machine learning model.

According to exemplary embodiments, the updating module 428 may be configured to automatically update a cluster from the machine learning model to which the new user should belong based on determining a commonality between applications corresponding to the new user's profile information and the applications corresponding to profile information of the users already belonging to the cluster.

According to exemplary embodiments, the updating module 428 may be further configured to dynamically and automatically update the machine learning model based on the updated cluster.

According to exemplary embodiments the execution module 430 may be configured to grant access to the new user in real time to access one or more requested applications from the updated machine learning model.

Figure 5:
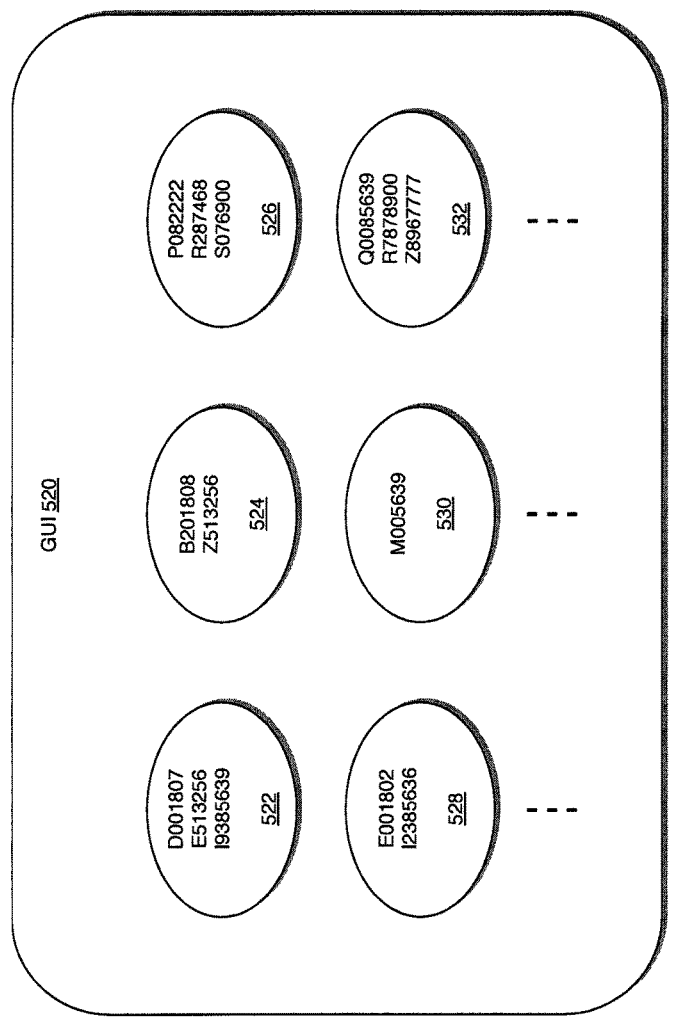
FIG. 5 illustrates a graphical user interface (GUI) that displays a machine learning model generated by a machine learning model execution module in accordance with an exemplary embodiment.

FIG. 5 illustrates a graphical user interface (GUI) that displays a machine learning model generated by a machine learning model execution module in accordance with an exemplary embodiment.

As illustrated in FIG. 5, a machine learning model 500 generated by the creation module 422 is displayed onto the GUI 520. The machine learning model 500 includes a plurality of clusters of users. According to exemplary embodiments, GUI 520 illustrates the machine learning model 500 having six clusters 522, 524, 526, 528, 530, and 532, but the disclosure is not limited thereto. Any number of clusters may be displayed on the GUI 520 that represents the optimal number of clusters automatically determined by the MLMEM 406.

For example, the creation module 422 may be configured to apply hierarchical clustering model algorithm to create optimal clusters by analyzing users using similar sets of applications. Based on such analysis, the creation module 422 may be configured to group or cluster users into the optimal cluster. For example, according to an exemplary embodiment, in creating the cluster 522, the determination module 426 may determine that users D001807, E513256, I9385639 (unique SID of each user) all have access to similar loan systems, similar databases, and similar applications, but all may have one or two dissimilar accesses. For example, although users D001807, E513256, I9385639 may all share a number of databases or applications, user D001807 may have access to a particular database or a particular application that the other two users E513256 and I9385639 may not have access to, and vice versa. However, the determination module 426 may determine that all three users D001807, E513256, and I9385639 should be grouped together onto the cluster 522 by determining that a commonality value is within a predetermined threshold value and a value corresponding to out of role access is below a predetermined threshold value.

According to exemplary embodiments, commonality value represents similarity value between users' existing applications and that of their profile. According to exemplary embodiments, the predetermined threshold value for comparing the commonality value to the predetermined threshold value may include the greatest number of commonality that falls within about 70% to about 90% similarity between a user's existing applications and applications included in the profile that the user belongs to and the least number of out of role access value that falls within about 0% to about 25%, but the disclosure is not limited thereto.

For example, user D001807 may have access to the following set of applications [a, b, c, d] and the cluster 522 allows its members to access the following set of applications [b, c, d, e]. The determination module 426 may determine that user D001807 should belong to cluster 522 because the user should have 75% commonality with the cluster 522 (3 out of 4 applications [b, c, d] are common between the user's applications and applications belonging to the cluster 522) and 25% out of role access. In this example, out of role access is application e.

According to exemplary embodiments, the optimal number of clusters may be a point in a line curve of a graph at which increasing the number of clusters does not increase the commonality, and wherein the number of clusters corresponds to an x-axis of the graph and the commonality corresponds to a y-axis of the graph.

Figure 6B:
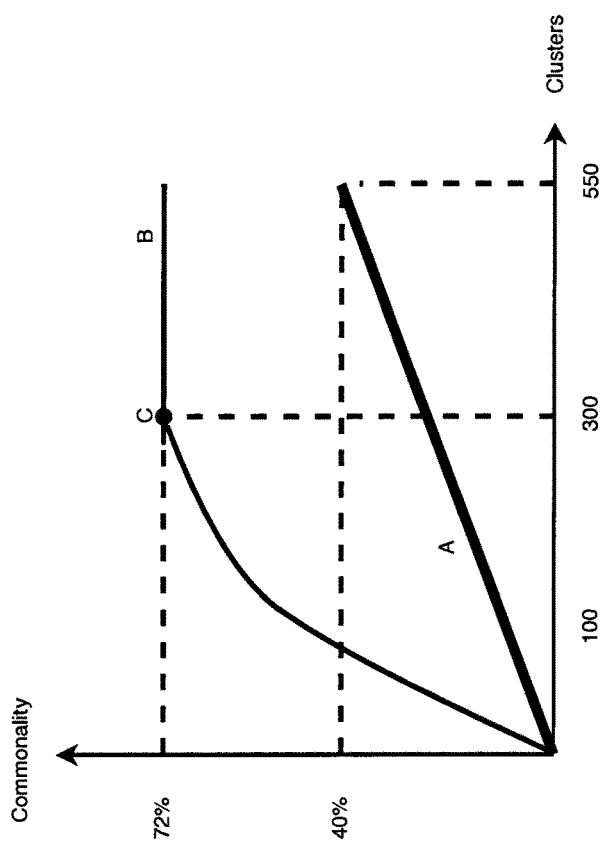
FIG. 6B illustrates a graphical representation of clusters and commonality of applications that were generated by utilizing a machine learning model execution module in accordance with an exemplary embodiment.
Figure 6A:
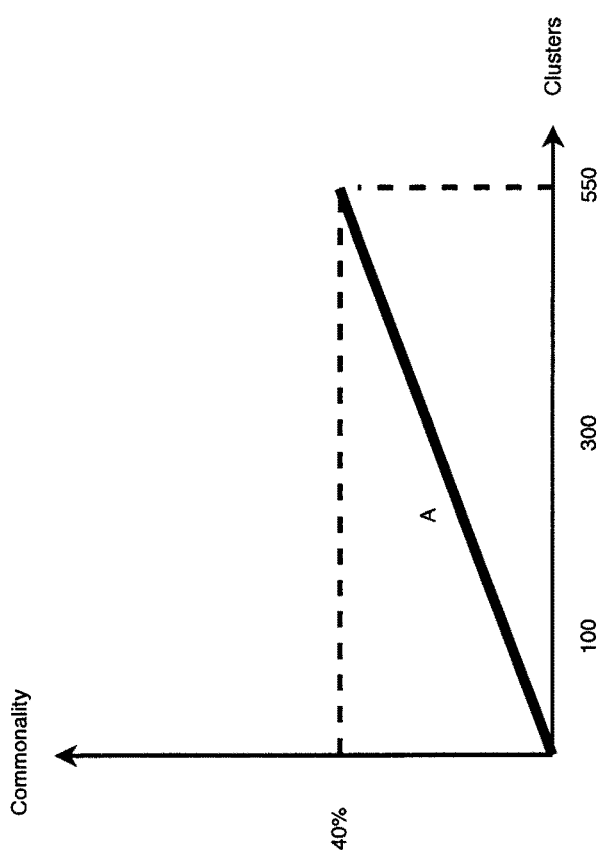
FIG. 6A illustrates a graphical representation of clusters and commonality of applications that were generated without utilizing a machine learning model execution module of the instant disclosure.

For example, FIG. 6A illustrates a graphical representation of clusters and commonality of applications that were generated without utilizing a machine learning model execution module of the instant disclosure. As illustrated in FIG. 6A, commonality of applications is approximately 40% (line A in FIG. 6A), out of role access of applications is approximately 35% where the optimal number of clusters is 550.

For example, conventional system, that does not implement an MLMEM 406 of the instant disclosure, may not be able to automatically and dynamically generate optimal number of clusters thereby significantly increasing processing time of requests to access one or more applications received from a computing device. Thus, the conventional system would be required to generate manually and statically assigned set of permissions and roles which may prove to be inconsistent, and particularly, commonality of applications between cluster members and out or role access of applications of cluster members would be unsatisfactory (not within the acceptable predetermined threshold values as disclosed above with respect to commonality value and out of role access value).

FIG. 6B illustrates a graphical representation of clusters and commonality of applications that were generated by utilizing the MLMEM 406 in accordance with an exemplary embodiment. As illustrated in FIG. 6B, commonality of applications is approximately 72% (line B in FIG. 6B), out of role access of applications is approximately 17% where the optimal number (least number) of clusters is 300. For example, a system, that implements an MLMEM 406 of the instant disclosure, may be able to automatically and dynamically generate optimal number of clusters thereby significantly reducing processing time of requests to access one or more applications received from a computing device. Thus, the system according to exemplary embodiments would not be required to generate manually and statically assigned set of permissions and roles which may prove to be inconsistent. Further, commonality of applications between cluster members and out or role access of applications of cluster members would be satisfactory (within the acceptable predetermined threshold values as disclosed above with respect to commonality value and out of role access value) by utilizing the MLMEM 406.

According to exemplary embodiments, the determination module 426 may be configured to determine the greatest number of commonality with the least number of clusters. For example, the determination module 426 may be configured to automatically determine a point (point C in line curve B as illustrated in FIG. 6B) when the commonalty does not go up even though the number of clusters are increased. Thus, the determination module 426 may be configured to identify a plateau point (point C in line curve B as illustrated in FIG. 6B) when the commonality approaches a line when the line does not go up anymore even though clusters are added. In this exemplary embodiments, the determination module 426 has determined that the optimal cluster point has been reached when the point C in the line curve B illustrates the least number of clusters (e.g., 300 clusters) with the greatest number of commonalities (e.g., 72% commonality).

For example, when the optimal point of clusters at point C in line curve B is determined by the determination module 426, it has been determined that no gain of multiple percentage point are received for adding every new clusters (e.g., every new 50 clusters) that the creation module 422 creates. Thus, the determination module 426 may be configured to analyze each of these new clusters and inquire what are the general applications that may be accessible to users belonging to these new clusters with corresponding HR attributes data (e.g., job code, cost center, location, title, etc.) and profile information data of the users included in these new clusters. Then, the determination module 426 may be configured to determine how to dissolve these new clusters and adding each user of these new clusters to one of the already created optimal clusters (in this example in FIG. 6B, the already created 300 clusters, which is determined to be optimal clusters) based on determining the highest commonality and the least out of role access algorithm as disclosed above.

According to exemplary embodiments, a user may belong to only one cluster. For example, users in cluster 522 should not belong to clusters 524, 526, 528, 530, and 532, and vice versa.

According to exemplary embodiments, the machine learning model 500 may be a role-based access control machine learning model that includes the optimal number of clusters (i.e., 300).

According to exemplary embodiments, each cluster 522, 524, 526, 528, 530, and 532 may include unique security identifiers (SIDs) of all users belonging to the cluster and data regarding the users' common accesses to the applications.

According to exemplary embodiments, the HR attributes of each user may include data regarding one or more of the following: job code, cost center, location, position, and title, but the disclosure is not limited thereto.

According to exemplary embodiments, the receiving module 416 may be further configured to receive a request from a new user to access one or more applications within the machine learning model and the evaluation module 432 may be configured to evaluate the received request with the machine learning model in real time. The execution module 430 may be configured to deny access to the requested one or more applications based on a determination made by the determination module 426 that the new user's profile information does not include the requested one or more applications. A notice of denial may be communicated to the user or a manager of the user via e-mail or other form electronic communications via the communication module 408.

According to exemplary embodiments, the commonality may be determined by the determination module 426 and the commonality may include about 70% to about 90% similarity between applications corresponding to the new user's profile information and the applications corresponding to profile information of the users already belonging to the cluster.

According to exemplary embodiments, the updating module 428 may be configured to automatically update a cluster (e.g., one of clusters 522, 524, 526, 528, 530, and 532) from the machine learning model 500 to which the new user should belong based on determining a commonality between applications corresponding to the new user's profile information and the applications corresponding to profile information of the users already belonging to the cluster.

According to exemplary embodiments, the updating module 428 may be further configured to dynamically and automatically update the machine learning model 500 based on the updated cluster.

According to exemplary embodiments the execution module 430 may be configured to grant access to the new user in real time to access one or more requested applications from the updated machine learning model 500.

According to exemplary embodiments, a non-transitory computer readable medium may be configured to store instructions for implementing the MLMEM 406. According to exemplary embodiments, the instructions, when executed, may cause a processor embedded within the MLMEM 406 or the MLMED 402 to perform the following: access human resource (HR) attributes and profile information data of users from a database; apply hierarchical clustering algorithm to create a machine learning model by clustering users based on accesses to applications that the users have corresponding to the profile information data of the users, wherein all users in one cluster have the most similar accesses to applications; and iterate the process of accessing the HR attributes and the profile information data of the users from the database until it is determined that an optimal number of clusters have been created for the machine learning model. The processor may be the same or similar to the processor 104 as illustrated in FIG. 1.

Figure 7:
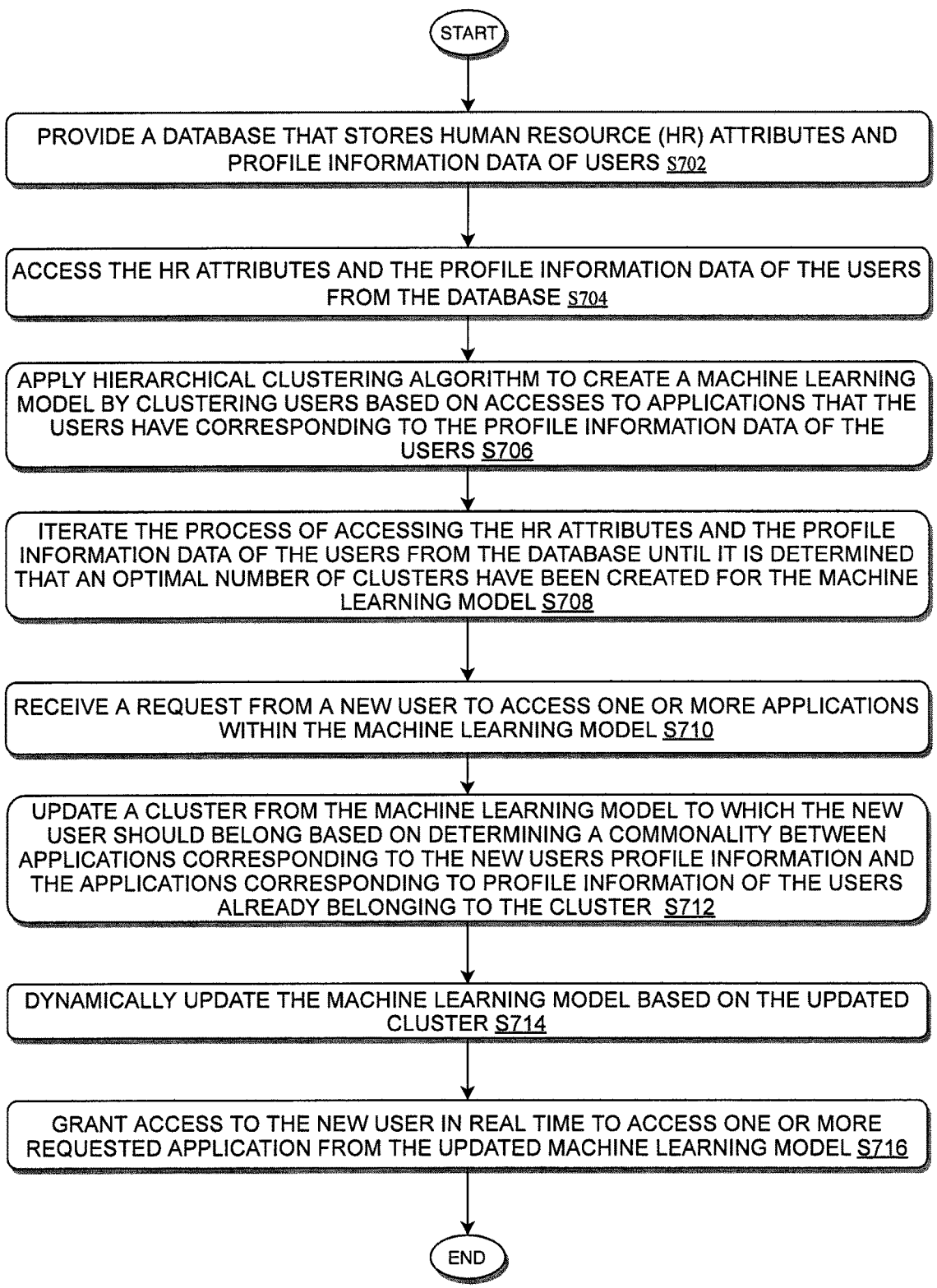
FIG. 7 illustrates a flowchart of an exemplary process for implementing a machine learning model execution module in accordance with an exemplary embodiment.

FIG. 7 illustrates a flowchart of an exemplary process for implementing a machine learning model execution module in accordance with an exemplary embodiment. The machine learning model execution module may be the MLMEM 306 as illustrated in FIG. 3 or the MLMEM 406 as illustrated in FIG. 4.

In the process 700 of FIG. 7, at step S702, a database may be provided that stores human resource (HR) attributes and profile information data of users.

At step S704, the HR attributes and the profile information data of the users may be accessed from the database.

At step S706, a machine learning model may be created by applying hierarchical clustering algorithm by clustering users based on accesses to applications that the users have corresponding to the profile information data of the users. All users in one cluster may have the most similar accesses to applications.

At step S708, the process of accessing the HR attributes and the profile information data of the users from the database may be iterated until it is determined that an optimal number of clusters have been created for the machine learning model. According to exemplary embodiments, at step S708, the optimal number of clusters may be determined based on determining the least number of clusters with the greatest number of commonality, wherein the commonality is a similarity between a user's existing applications and applications included in the profile that the user belongs to. According to exemplary embodiments, the optimal number of clusters is a point in a line curve of a graph at which increasing the number of clusters does not increase the commonality, and wherein the number of clusters corresponds to an x-axis of the graph and the commonality corresponds to a y-axis of the graph.

At step S710, a request may be received from a new user to access one or more applications within the machine learning model.

At step S712, a cluster from the machine learning model may be automatically updated to which the new user should belong based on determining a commonality between applications corresponding to the new user's profile information and the applications corresponding to profile information of the users already belonging to the cluster.

At step S714, the machine learning model may be dynamically and automatically updated based on the updated cluster.

At step S716, access may be granted to the new user in real time to access one or more requested applications from the updated machine learning model.

According to exemplary embodiments, the process 700 may further include: receiving a request from a new user to access one or more applications within the machine learning model; evaluating the received request with the machine learning model in real time to deny access to the requested one or more applications based on determining that the new user's profile information does not include the requested one or more applications.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a machine learning model execution module for automatically generating an optimal number of clusters for granting access to a plurality of applications by utilizing one or more processors and one or more memories, the method comprising:
   providing a database that stores human resource (HR) attributes and profile information data of users;
   accessing the HR attributes and the profile information data of the users from the database;
   applying hierarchical clustering algorithm, by utilizing a processor, to create a machine learning model by clustering users based on accesses to applications that the users have corresponding to the profile information data of the users, wherein all users in one cluster have the most similar accesses to applications;
   iterating the process of accessing the HR attributes and the profile information data of the users from the database until it is determined that an optimal number of clusters have been created for the machine learning model;
   receiving a request from a new user to access one or more applications within the machine learning model;
   automatically updating a cluster from the machine learning model to which the new user should belong based on determining a commonality between applications corresponding to the new user's profile information and the applications corresponding to profile information of the users already belonging to the cluster, wherein the commonality includes about 70% to about 90% similarity between applications corresponding to the new user's profile information and the applications corresponding to profile information of the users already belonging to the cluster; and
   granting access to the new user in real time to access one or more requested applications from the updated machine learning model.

2. The method according to claim 1, further comprising:
   determining the optimal number of clusters based on determining the least number of clusters with the greatest number of the commonality, wherein the commonality is a similarity between a user's existing applications and applications included in the profile that the user belongs to.

3. The method according to claim 2, wherein the optimal number of clusters is a point in a line curve of a graph at which increasing the number of clusters does not increase the commonality, and wherein the number of clusters corresponds to an x-axis of the graph and the commonality corresponds to a y-axis of the graph.

4. The method according to claim 2, wherein the commonality excludes about 0% to about 25% similarity between applications corresponding to the new user's profile information and the applications corresponding to profile information of the users already belonging to the cluster.

5. The method according to claim 1, wherein the machine learning model is a role-based access control machine learning model that includes the optimal number of clusters.

6. The method according to claim 1, wherein each cluster includes unique security identifiers of all users belonging to the cluster and data regarding the users' common accesses to the applications.

7. The method according to claim 6, further comprising:
   displaying the machine learning model on a graphical user interface, wherein the machine learning model includes the each cluster of the optimal number of clusters.

8. The method according to claim 1, wherein the HR attributes of each user includes data regarding one or more of the following: job code, cost center, location, position, and title.

9. The method according to claim 1, further comprising:
   dynamically and automatically updating the machine learning model based on the updated cluster.

10. The method according to claim 1, further comprising:
    receiving a request from a new user to access one or more applications within the machine learning model; and
    evaluating the received request with the machine learning model in real time to deny access to the requested one or more applications based on determining that the new user's profile information does not include the requested one or more applications.

11. A system for implementing a machine learning model execution module for automatically generating an optimal number of clusters for granting access to a plurality of applications, comprising:
    a database that stores human resource (HR) attributes and profile information data of users; and
    a processor operatively connected to the database via a communication network, wherein the processor is configured to:
    access the HR attributes and the profile information data of the users from the database;
    apply hierarchical clustering algorithm to create a machine learning model by clustering users based on accesses to applications that the users have corresponding to the profile information data of the users, wherein all users in one cluster have the most similar accesses to applications;
    iterate the process of accessing the HR attributes and the profile information data of the users from the database until it is determined that an optimal number of clusters have been created for the machine learning model;
    receive a request from a new user to access one or more applications within the machine learning model;
    automatically update a cluster from the machine learning model to which the new user should belong based on determining a commonality between applications corresponding to the new user's profile information and the applications corresponding to profile information of the users already belonging to the cluster, wherein the commonality includes about 70% to about 90% similarity between applications corresponding to the new user's profile information and the applications corresponding to profile information of the users already belonging to the cluster; and
    grant access to the new user in real time to access one or more requested applications from the updated machine learning model.

12. The system according to claim 11, wherein the processor is further configured to:
    determine the optimal number of clusters based on determining the least number of clusters with the greatest number of the commonality, wherein the commonality is a similarity between a user's existing applications and applications included in the profile that the user belongs to.

13. The system according to claim 12, wherein the optimal number of clusters is a point in a line curve of a graph at which increasing the number of clusters does not increase the commonality, and wherein the number of clusters corresponds to an x-axis of the graph and the commonality corresponds to a y-axis of the graph.

14. The system according to claim 12, wherein the commonality excludes about 0% to about 25% similarity between applications corresponding to the new user's profile information and the applications corresponding to profile information of the users already belonging to the cluster.

15. The system according to claim 11, wherein each cluster includes unique security identifiers of all users belonging to the cluster and data regarding the users' common access to the applications.

16. The system according to claim 15, wherein the processor is further configured to:
display the machine learning model on a graphical user interface, wherein the machine learning model includes the each cluster of the optimal number of clusters.

17. The system according to claim 11, wherein the HR attributes of each user includes data regarding one or more of the following: job code, cost center, location, position, and title.

18. The system according to claim 11, wherein the processor is further configured to:
dynamically and automatically update the machine learning model based on the updated cluster.

19. The system according to claim 11, wherein the processor is further configured to:
receive a request from a new user to access one or more applications within the machine learning model; and
evaluate the received request with the machine learning model in real time to deny access to the requested one or more applications based on determining that the new user's profile information does not include the requested one or more applications.

20. A non-transitory computer readable medium configured to store instructions for implementing a machine learning model execution module for automatically generating an optimal number of clusters for granting access to a plurality of applications, wherein when executed, the instructions cause a processor to perform the following:
access human resource (HR) attributes and profile information data of users from a database;
apply hierarchical clustering algorithm to create a machine learning model by clustering users based on accesses to applications that the users have corresponding to the profile information data of the users, wherein all users in one cluster have the most similar accesses to applications;
iterate the process of accessing the HR attributes and the profile information data of the users from the database until it is determined that an optimal number of clusters have been created for the machine learning model;
receive a request from a new user to access one or more applications within the machine learning model;
automatically update a cluster from the machine learning model to which the new user should belong based on determining a commonality between applications corresponding to the new user's profile information and the applications corresponding to profile information of the users already belonging to the cluster, wherein the commonality includes about 70% to about 90% similarity between applications corresponding to the new user's profile information and the applications corresponding to profile information of the users already belonging to the cluster; and
grant access to the new user in real time to access one or more requested applications from the updated machine learning model.

\* \* \* \* \*